United States Patent
Volgyesi et al.

(10) Patent No.: US 10,871,548 B2
(45) Date of Patent: Dec. 22, 2020

(54) SYSTEMS AND METHODS FOR TRANSIENT ACOUSTIC EVENT DETECTION, CLASSIFICATION, AND LOCALIZATION

(71) Applicant: Fazecast, Inc., Nashville, TN (US)

(72) Inventors: Peter Volgyesi, Nashville, TN (US); Janos Sallai, Nashville, TN (US); Akos Ledeczi, Nashville, TN (US); Gyorgy Balogh, Budapest (HU)

(73) Assignee: FAZECAST, INC., Nashville, TN (US)

( * ) Notice: Subject to any disclaimer, the term of this patent is extended or adjusted under 35 U.S.C. 154(b) by 660 days.

(21) Appl. No.: 15/368,632

(22) Filed: Dec. 4, 2016

(65) Prior Publication Data

US 2017/0328983 A1 Nov. 16, 2017

Related U.S. Application Data

(60) Provisional application No. 62/263,348, filed on Dec. 4, 2015.

(51) Int. Cl.
| | |
|---|---|
| *G01S 5/22* | (2006.01) |
| *G01S 5/00* | (2006.01) |
| *G01S 5/28* | (2006.01) |
| *G01S 19/13* | (2010.01) |
| *G01S 5/18* | (2006.01) |

(52) U.S. Cl.
CPC ............... *G01S 5/22* (2013.01); *G01S 5/0036* (2013.01); *G01S 5/28* (2013.01); *G01S 5/18* (2013.01); *G01S 19/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,686,655 | A * | 8/1987 | Hyatt ................... | B60R 16/0373 367/41 |
| 2012/0098704 | A1* | 4/2012 | Arnoult, Jr. ........... | G01S 5/0294 342/418 |
| 2012/0300587 | A1* | 11/2012 | Azimi-Sadjadi ........ | G01S 11/14 367/127 |
| 2014/0278115 | A1* | 9/2014 | Bas ........................ | G01V 1/30 702/14 |
| 2015/0134580 | A1* | 5/2015 | Wilson ................. | G06N 3/0436 706/25 |
| 2016/0157828 | A1* | 6/2016 | Sumi .................. | G01N 29/0654 702/189 |
| 2017/0253330 | A1* | 9/2017 | Saigh .................... | B64C 39/024 |
| 2017/0325056 | A1* | 11/2017 | Mehta ..................... | H04W 4/90 |

* cited by examiner

*Primary Examiner* — Hovhannes Baghdasaryan
*Assistant Examiner* — Amie M Ndure
(74) *Attorney, Agent, or Firm* — Baker, Donelson, Bearman, Caldwell & Berkowitz PC

(57) ABSTRACT

A system is described that comprises a plurality of sensor nodes and at least one remote server, wherein each sensor node of the plurality of sensor nodes and the at least one remote server are communicatively coupled, wherein the plurality of sensor nodes receive at least one acoustic signal, process the at least one acoustic signal to detect one or more transient events, classify the one or more transient events as an event type, and determine geometry information and timing information of the one or more transient events. The system comprises at least one of the plurality of sensor nodes and the at least one remote server identifying the source of the one or more transient events.

32 Claims, 10 Drawing Sheets

SYSTEMS AND METHODS FOR TRANSIENT ACOUSTIC EVENT DETECTION, CLASSIFICATION, AND LOCALIZATION

CROSS REFERENCE TO RELATED APPLICATIONS

This application claims the benefit of U.S. Patent Application No. 62/263,348, filed Dec. 4, 2015.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

Acoustic event detection, classification, and localization are all well-researched topics. Due to numerous recent tragic incidents involving active shooters, interest in methods and systems that detect and localize the source of gunfire has grown considerably. The current state of the art, however, has numerous shortcomings, most notably the presence of relatively high false positive detection rates. Furthermore, the typical acoustic source localization systems use well-known multilateration or triangulation methods. Both of these are susceptible to non-line-of-sight detections common in urban areas. Finally, high urban noise levels can mask lower energy and/or distant transient events of interest resulting in missed detections. The present disclosure addresses all three of these current shortcomings.

FIELD OF THE INVENTION

The present disclosure relates to the field of transient acoustic event detection, classification, and localization.

BRIEF DESCRIPTION OF THE DRAWINGS

So that the manner in which the present application can be better understood, certain illustrations and figures are appended hereto. It is to be noted, however, that the drawings illustrate only selected embodiments and elements of systems and methods for transient acoustic event detection, classification, and localization and are therefore not to be considered limiting in scope for the systems and methods as described herein may admit to other equally effective embodiments and applications.

DETAILED DESCRIPTION

The recent emergence of "deep learning," relying on convolutional neural networks, has resulted in superior performance in image recognition, speech recognition, and other fields. The present disclosure applies novel deep learning techniques to transient acoustic event classification. Furthermore, it applies a novel Hough-transform based sensor fusion algorithm to solve the data association problem that has superior performance working with noisy detections, including false or non-line-of-sight events as well as multiple near-simultaneous events. The final significant contribution of the present disclosure is its ability to detect events in signals with very low Signal to Noise Ratios (SNR) by using spectral flux-based filtering.

Systems and methods are described herein for providing a distributed acoustic sensor network. Under one embodiment, the distributed acoustic sensor network detects, classifies, and localizes transient, impulsive acoustic signals, including gunshots, firecrackers, explosions, screams, car crashes, etc. The systems and methods described herein include multiple sensor nodes each equipped with at least four acoustic channels with one microphone each, a GPS module for node location and precise absolute timing, as well as sufficient computational capabilities to carry out the necessary acoustic signal processing, event detection, classification, and localization tasks. Moreover, the nodes are connected to either each other, a server, and/or a cloud infrastructure via a wired or wireless network.

Figure 1:
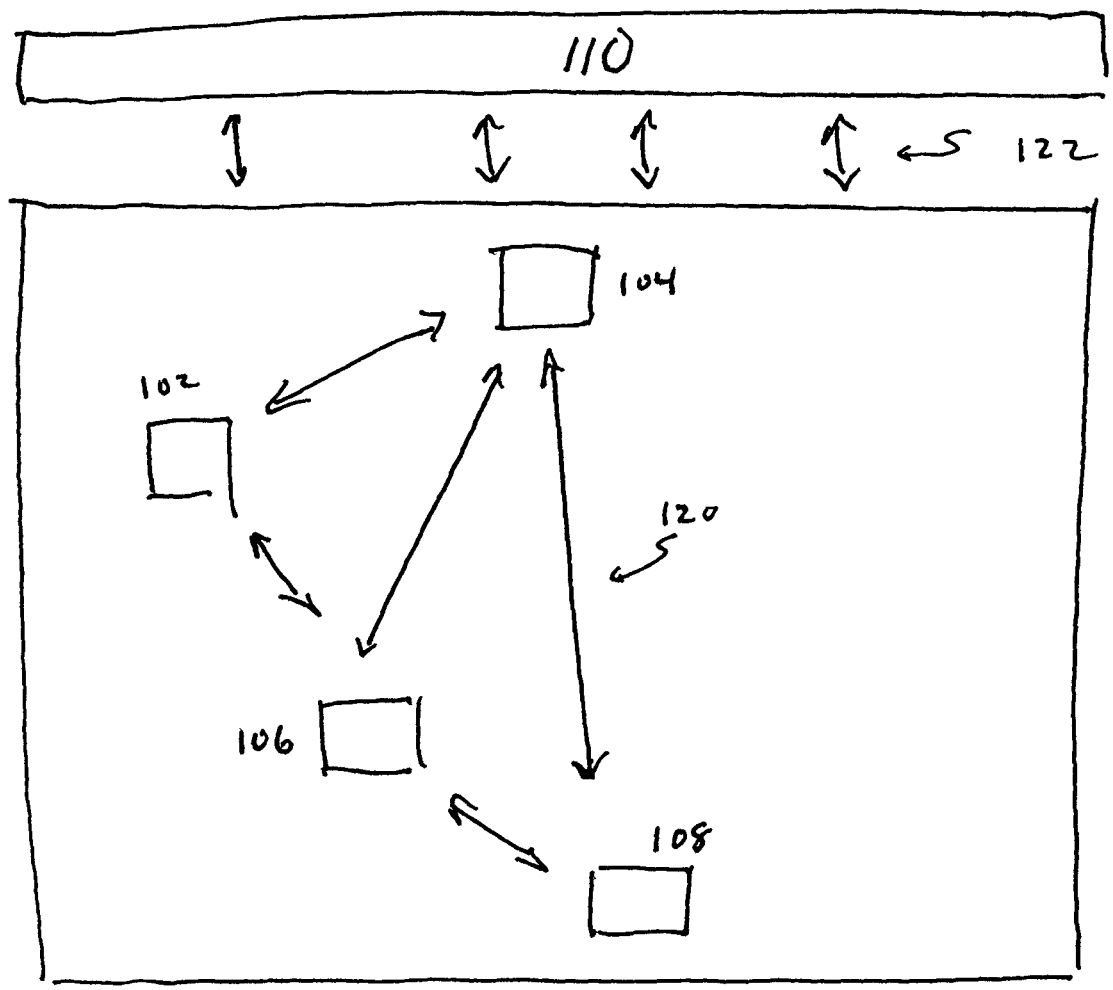
FIG. 1 shows sensor nodes located in an environment, under an embodiment.

FIG. 1 shows sensor nodes 102, 104, 106, 108 located in a geographic environment, under an embodiment. FIG. 1 shows that the nodes 102, 104, 106, 108 may be communicatively coupled with each other through either wired or wireless network 120. Further, the nodes may be communicatively coupled with a remote server and/or a cloud infrastructure 110 via a wired or wireless network 122.

Figure 2:
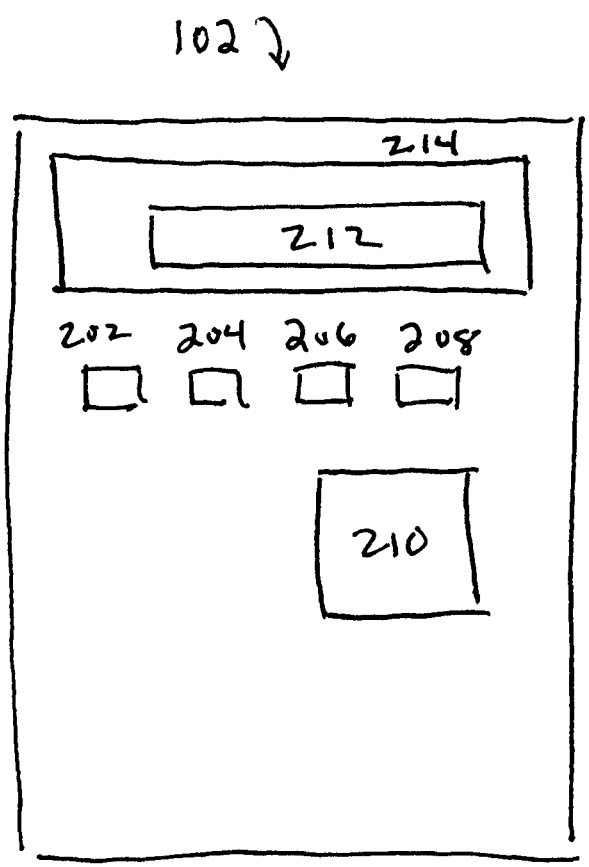
FIG. 2 shows a sensor node, under an embodiment.

FIG. 2 shows a sensor node 102 as seen in FIG. 1 under an embodiment. FIG. 2 shows acoustic channels 202, 204, 206, 208. FIG. 2 also shows GPS unit 210. The sensor node also shows one or more applications 212 running on at least one processor 214 for carrying out the necessary acoustic signal processing, event detection, classification, and/or localization tasks described herein.

Each sensor node under one embodiment samples all acoustic channels continuously and converts the analog signal into a digital data stream. Typical parameters for this process are 48 kilo-samples per second (ksps) at 16-bit resolution. The event detection process may be run on one selected channel or all channels simultaneously. When an event is detected, a classification algorithm of an embodiment determines whether the event falls into one of the target classes or not. The classification can be performed on any one channel or on a composite signal obtained by beamforming all channels steered toward the event of interest to improve the signal to noise ratio (SNR). Beamforming is a form of spatial filtering. Even the simplest known approach to beamforming, the Delay-Sum technique, can improve the SNR by amplifying the signal coming from a particular direction relative to signals coming from all other directions. The well-known Delay-Sum technique picks one microphone and computes the delay of an acoustic signal coming from a known direction at each additional microphone based on its relative location to the selected microphone and the speed of sound. Then it adds together the acoustic signals from all the channels each shifted by the computed delay. The result of this process is that the sound from the given direction is amplified. In this scenario, the Angle of Arrival (AoA) of an event of interest can be estimated per the following paragraph, and the beamforming can be performed accordingly.

If the event is classified into one of the classes of interest, the Angle of Arrival (AoA) and Time of Arrival (ToA) of the signal is estimated. The AoA estimation process under one embodiment is based on cross-correlating the channels on a single node. The ToA estimation under one embodiment is obtained by timestamping a selected sample of one of the channels, for example, the maximum of the cross-correlation function within the event. The precise absolute time corresponding to that selected sample is obtained using the Pulse Per Second (PPS) pin of the GPS unit of the sensor node.

The AoA and ToA data, as well as the detected event class, are sent to the cloud, to a dedicated server, and/or to all sensor nodes in the vicinity. A localization algorithm then estimates the source location and notifies the user of the system. If only one node detects an event, then the node's location and the direction to the acoustic source from that location may be provided to the user.

The systems and methods described herein comprise one or more spectral-flux filter-based transient event detection methodologies, a deep convolutional neural network-based event classification function, and a Hough transform-based source localization algorithm.

Transient Event Detection Using Spectral Flux

There are several proven methods and published results on the detection of musical notes in polyphonic music [1, 2]. Of particular interest to the systems and methods described herein is the spectral flux method, which measures the magnitude change across frequency bins using a short-time Fourier transform. In one embodiment of the invention, this technique is applied to detect transient, impulsive events in noisy acoustic signals.

Figure 3:
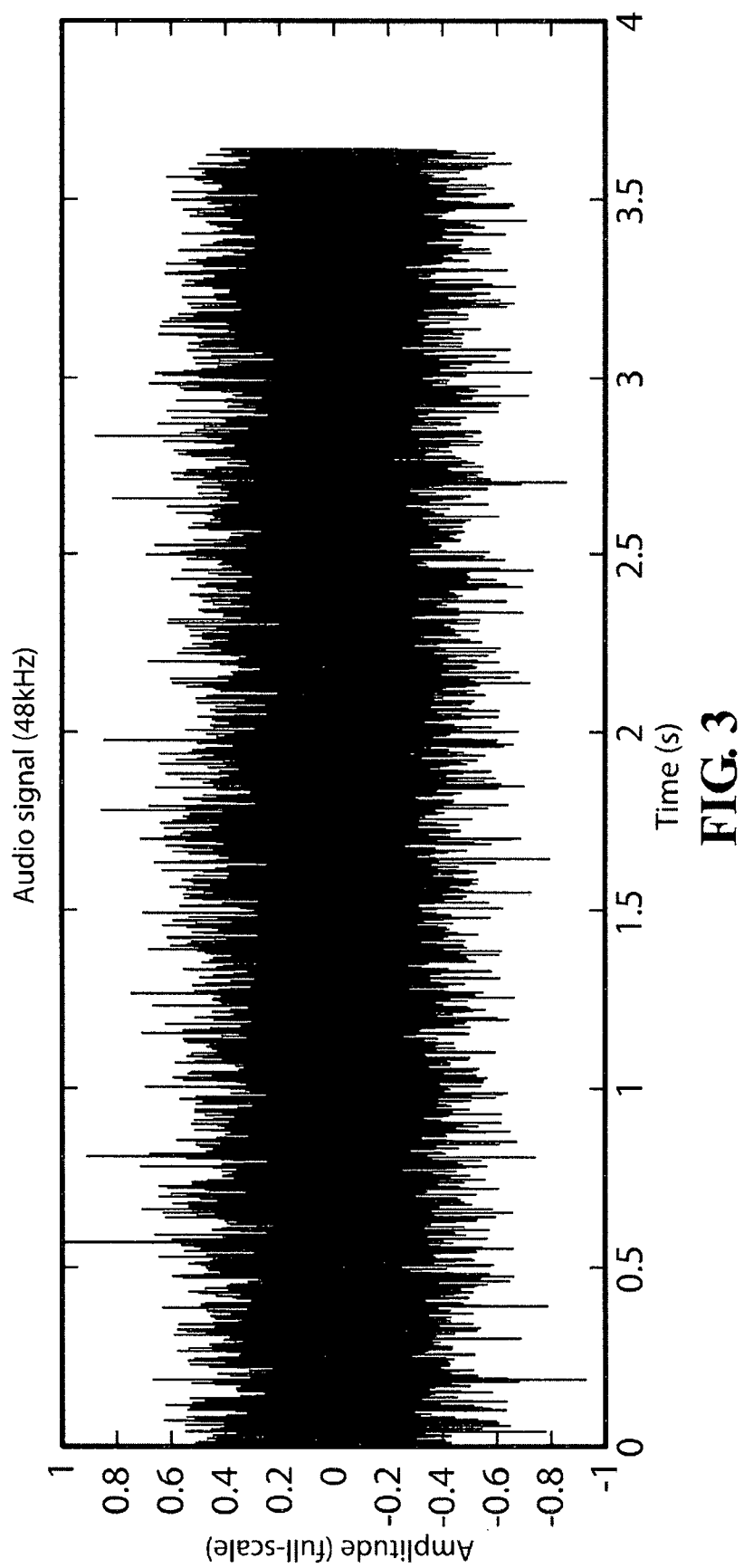
FIG. 3 show a time domain representation of street noise, under an embodiment.
Figure 4:
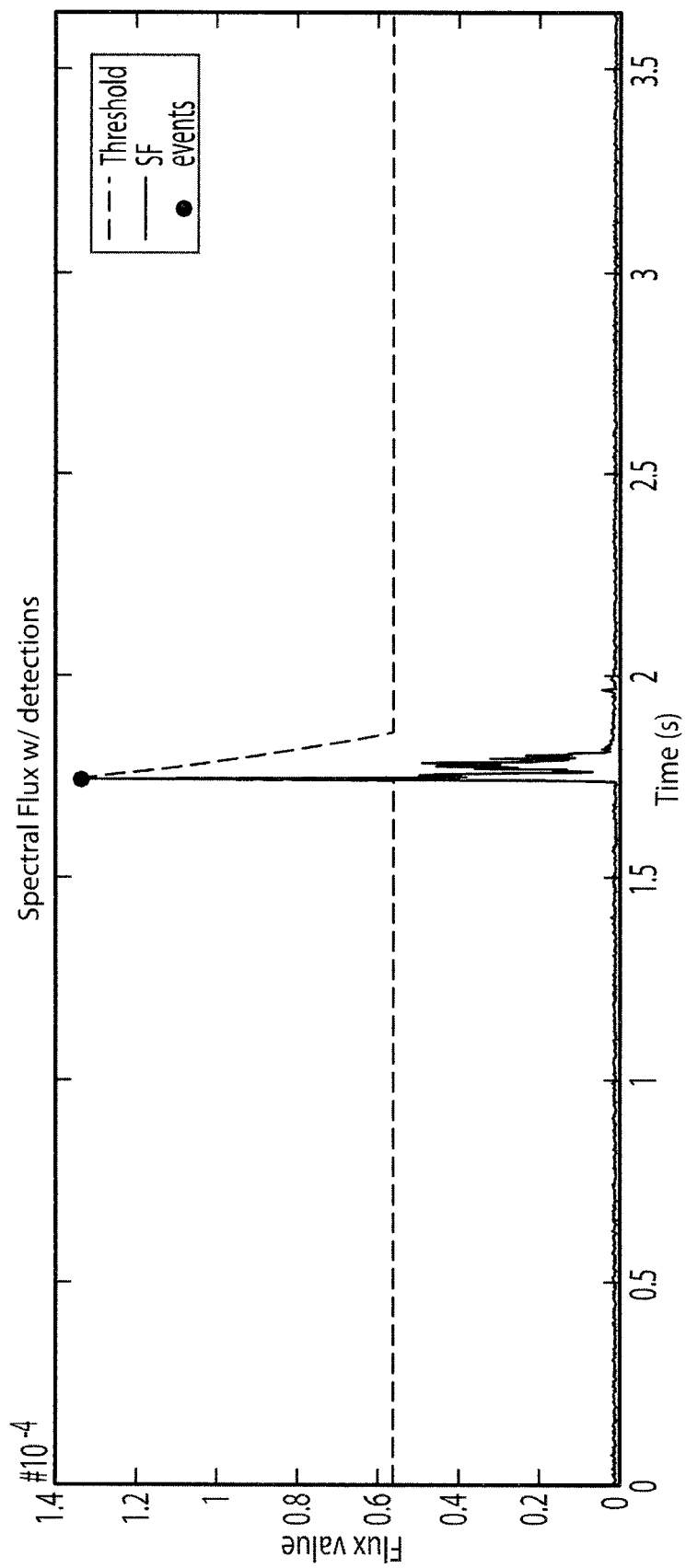
FIG. 4 shows an SK filtered signal corresponding to the signal shown in FIG. 3, under an embodiment.

One application of this technique computes the short-time Fourier transform of the signal using a fixed frequency resolution and time overlap. The change in spectral magnitudes in adjacent timeslots of mid- and high-frequency bins as defined by a spectral mask are summed using the $L_2$-norm, which results in the spectral flux (SF) measure. The effectiveness of the approach is illustrated in FIG. 3 and FIG. 4 below. FIG. 3 shows an approximately 3.5 second long noisy audio clip with a gunshot located at approximately 1.7 seconds. The x-axis comprises seconds while the y-axis comprises signal amplitude represented in digital sample scale (no physical unit because analog channels are uncalibrated). FIG. 4 shows the SF signal with adaptive threshold clearly showing the transient event. The x-axis comprises seconds while the y-axis comprises flux. The spectral flux signal is a digital value (i.e., no physical unit because analog channels are uncalibrated).

A simple adaptive threshold-based detector is used to identify the potential transient events of interest. The adaptive threshold is computed by applying an exponential filter on the SF signal with a minimum value and rising edge override. That is, the threshold signal is allowed to rise almost as fast as the original SF signal and never goes below a pre-set threshold. Multiple repeated detections (glitches) are avoided by a short blanking interval after the first detection. The blanking interval prevents multiple (false) triggerings for the same acoustic event. This interval allows the adaptive threshold level to safely rise above the current signal flux level. The classifier can then work on either the original signal or its high-pass filtered version—for example, for mitigating wind noise—along with a timestamp identifying the location of the event. For example, a one-second long audio buffer with the onset of the event at exactly the middle of the buffer can be created and passed on to the event classifier algorithm.

Event Classification Using Deep Neural Networks

Under one embodiment, all significant transient acoustic events are inspected and classified by a deep convolutional neural network (CNN) embedded in the sensor node. The goal of this step is to make a decision as to whether the acoustic transient is of interest; that is, if it was generated by a gunshot, car crash, explosion, etc. The CNN step may be efficiently executed for a batch of independent samples; thus, it can either be fed audio signal segments captured at each microphone or different combinations of selected channels (e.g., beamforming). Under one embodiment, the classifier assigns a probability vector to each element in the batch, representing the prediction of the sample for each class.

The CNN may be trained with a large set of labeled examples, and the result of this supervised learning process-the inferred weights and biases-is embedded in each sensor node. This approach, most notably the separation of software code and trained data, also enables a straightforward and simplistic mechanism for improving and updating the classifier in already deployed equipment, since no software updates are required, only new data models. The current CNN architecture depends under one embodiment on 2-4 million weights, thus requiring sizeable and diverse training datasets.

Instead of learning and predicting from raw audio data, a simple preprocessing step computes the Short-Time Fourier Transform (STFT) of the signal near the transient trigger. The resulting two-dimensional data structure contains sinusoidal frequency and phase information while preserving the time-varying dynamics. Using half-overlapping windows and a few tens of Hertz frequency resolution, these 2D arrays may contain 20-40 k values.

At the input of the CNN, the system employs a stack of convolutional network layers, connected by non-linear activation functions, pooling, and drop-out layers. Each convolutional layer may contain multiple hundreds of independent filter kernels, each of which is used to compute a new one-dimensional output signal based on a two-dimensional input by using convolution in one dimension. E.g., the first convolutional layer is provided by the STFT data (2D), and each filter kernel is shifted through the time domain while working with all frequency bins to produce its 1D output signal in the time domain. By merging the output of the individual filters, the next layer is presented by a new 2D input dataset. Pooling layers are used to shrink and decimate these signals in the time domain after convolutional filtering. Drop-out layers help to minimize overfitting during training.

After the stack of convolutional/pooling layers, the system uses fully-connected layers interspersed with rectifier linear units (ReLU). The activation of these traditional neural network layers are computed by matrix multiplications with added bias offsets. The size of these layers decreases progressively, and the final layer contains exactly as many output activations as the number of classification categories the system is targeting (two in the binomial case). The final probabilities are calculated by computing the softmax function (normalized exponential) on the network outputs. Probabilistic drop-out layers may also be used in the training phase as well.

An embodiment of the CNN classification computes the input feature vector from 32 k samples around the event trigger. The feature vector is the spectrogram on these samples using a Hamming-window-ed 1024-point FFT with a 500 sample stride. This results in an 512×64 input array. The first convolutional layer in the CNN network uses a 7 sample wide kernel with 256 output depth, thus transforming the original 512×64 inputs to a new layer of 256×58 samples. A pooling layer selects the maximum values in two adjacent input vectors, resulting in a reduced 256×29 array. The consecutive fully-connected neural layer makes a further reduction to 128 samples. Finally, the output layer maps these 128 samples to two output class probabilities under an embodiment. At each layer the current implementation uses ReLU activation functions. The convolutional layer and the two fully-connected neural layers require close to 2 million weight and bias parameters to implement the described structure.

Source Localization

Assuming that individual sensors are capable of measuring the time of arrival (ToA) and angle of arrival (AoA) of transient acoustic events, the position of the signal source can be computed using well-known techniques such as multilateration and/or triangulation under one embodiment.

Multilateration relies on the fact that a spherical wavefront emanating from a source reaches different microphones at different times, depending on the source-to-sensor distances. Assuming that the speed of sound is known, we can compute the distance difference of the two sensors from the sound source by measuring the time differences of arrival at two microphones, thus constraining the unknown source position on a hyperbola (assuming a 2-dimensional geometry). Multiple sensor pairs detecting the same acoustic event will yield additional hyperbolae, which will necessarily intersect each other at the position of the source.

Triangulation computes the unknown sound source position by relying exclusively on the angle of arrival measurements from the sensors. For a pair of sensors, the intersection of half lines starting at the sensor position and running parallel to each respective sensor's AoA vector yields the source position.

There are two significant issues with the applicability of existing methods to transient acoustic source localization. First, a common practical shortcoming that both triangulation- and multilateration-based techniques suffer from is a lack of robustness with respect to measurement, positioning, and orientation errors. In presence of errors, the hyperbolae or half lines may never intersect at a single point, and they may not intersect at all. While Gaussian measurement errors may be manageable to some extent with nonlinear optimization or maximum likelihood-based methods, the presence of non-Gaussian noise, such as false positive detections or non-line-of-sight signal propagation, may cause these existing techniques to fail.

The second issue that affects existing sensor fusion approaches arises when a series of transient acoustic events are emitted at multiple locations in short succession. Assuming that all sensors detect all events, the order in which the distinct acoustic wavefronts will reach the sensors is dependent on the geometry of the deployment as well as the unknown position of the sources. That is, the association of the ToA/AoA measurement to a particular acoustic event is unknown. As both multilateration and trilateration depend on all ToA/AoA measurements belonging to the same event, neither of them are applicable to multiple-source scenarios.

Hough Transform

To tackle this issue, the systems and methods proposed herein include a Hough-transform [3] based approach to acoustic source localization that under an embodiment a) is robust against non-Gaussian measurement noise and b) solves the data association problem previously described.

The Hough transform (HT) is an image processing technique that is used to detect lines (or other shapes) in digital images, although some of its applications are outside of the image processing domain [4,5]. In a typical use case scenario, the image is preprocessed first (e.g. with an edge detector) to obtain pixels that are on the lines (or curves) in image space. Unfortunately, because of noise in the image, there may be missing pixels, and the extracted pixels often do not align well with the lines (curves) that we look for. For this reason, it is often nontrivial to group the extracted pixels to an appropriate set of lines (curves). The purpose of the Hough transform is to assign these pixels to line (curve) instances by performing a voting procedure in a parameter space where the lines (curves) can be described with a small number of parameters.

Line Detection Example

The simplest case of the Hough transform is detecting straight lines. In the image space, a line can be described as $$y = mx + b$$

where m is the slope parameter and b is the y-intercept parameter. In the Hough transform, the main idea is to represent the line not as a series of image points, but rather in terms of its parameters. That is, in parameter space, a line is represented as a point (m,b).

For practical reasons (namely that m and b can be unbounded even for small images), we use the polar coordinate system to represent lines in the parameter space:

$$d = x \cos \theta + y \sin \theta$$

where the parameters of the line are d, the perpendicular distance of the line from the origin of the image, and θ, the angle of the line's normal vector. Notice that both d and θ are bounded. It is now possible to associate with each line in the image a point (d,θ) in parameter space (also called Hough space). For an arbitrary point ($x_0$, $y_0$) in the image, the set of lines that go through this point have parameters d and θ, such that, given the θ parameter, d is determined by the following formula:

$$d(\theta) = x_0 \cos \theta + y_0 \sin \theta$$

This formula corresponds to a curve in the parameter space, which is unique to pixel ($x_0$,$y_0$). If several pixels in the image space are given, we get a separate curve in parameter space for each of them. The points (in parameter space) where these curves cross necessarily correspond to a line that passes through each of the corresponding image pixels. That is, the Hough transform converts the problem of detecting collinear points in image space to a problem of detecting intersecting curves in parameter space.

The Hough transform implementation uses under an embodiment a two-dimensional accumulator matrix, where columns correspond to θ bins and rows correspond to d bins, with some predefined resolution. Initially, the entire accumulator matrix is set to zero. Then, for each pixel in image space, the algorithm calculates the d and θ parameters of all lines passing through it, and increases the value of the bins corresponding to those (d,θ) pairs by one. Once all pixels are processed, the algorithm searches for local maxima in the accumulator matrix. The d and θ parameters of each local maxima represent a line in the image, and the corresponding accumulator value tells us how many pixels are positioned on that particular line.

Applicability to Acoustic Event Detection

The problem of identifying lines in raster images with the Hough transform shares a number of important traits with the transient acoustic source location problem:

1. In neither case is it assumed that the number of results (lines or source positions) is known a priori.
2. The HT algorithm does not require association of raster pixels-to-lines to be given. Analogously, if multiple simultaneous shots are fired, the sensors will take multiple measurements, but are unable to associate ToA/AoA measurements with the particular acoustic events.
3. The raster images may contain arbitrary pixels that do not belong to any lines. The Hough transform exhibits robustness to such image noise, due to the fact that when transformed into Hough space, the curves corresponding to noise pixels are unlikely to intersect at a common point; therefore, they will not contribute to false results. Similarly, a solution to the acoustic source localization problem must also be resilient against non-line-of-sight measurements or false positive detections.

HT-Based Acoustic Source Location

A Hough transformation-based approach may be applied to this problem as follows. Under one embodiment let us assume, for simplicity, that we search for the source positions in a 2-dimensional space. In this case, we set up the parameter space as (x,y,t), where x and y are the coordinates of the position of the sound source, and t is the time of emission. The parameter space is necessarily bounded by the muzzle blast detection range of the sensors in the (x,y) spatial dimensions.

Under an embodiment, the temporal dimension is also bounded by the time of the latest/earliest detections, plus/minus the time it takes for the sound to travel across the spatial dimensions of the parameter space. How do we map muzzle blast detections to this parameter space? Intuitively, if the event happened 2 seconds before the sensor detected the transient acoustic event, the source must be on a circle centered at the sensor's position with radius r=2c≈680 m, where c is the speed of sound, which is approximately 340 m/s at room temperature. Similarly, if the shot was fired 1 second before the detection, the radius of the circle would be r=1c≈340 m. If the transient acoustic event was emitted exactly at the time of the detection, the radius of the circle is 0 (and the shooter position is exactly at the position of the sensor).

By generalizing this approach under an embodiment, if sensor $M_i$, located at $(x_i, y_i)$, detects a wavefront of the $j^{th}$ event at time $t_{i,j}$, we known that the point representing the source position and emission time $(x_j,y_j,t_j)$ in parameter space is on the surface of a cone. The axis of the cone is perpendicular to the (x,y) plane, the tip of the cone is at $(x_i, y_i,t_{i,j})$, and the cone angle is $\tan^{-1} c$, c being the speed of sound. If an event happened at position $(x_j,y_j)$ at time $t_j$, the cone surfaces corresponding to detections of sensors that observed the wavefront necessarily intersect at point $(x_j,y_j, t_j)$. It is easy to see that at least three sensor detections are required to unambiguously identify the source position. This approach is capable of identifying multiple simultaneous events as well. All cones generated by sensor detections of the same event will necessarily have a common intersection point. However, three or more cones generated by detections of different events will never have a common intersection point. Similarly, random false positive detections, i.e. those that do not correspond to any acoustic event, will result in cones that are arbitrarily positioned; therefore, the likelihood of their intersection with two or more other cones at a single point is minimal. Because of this, the Hough transform-based event localization approach is robust to erroneous sensor detections, unlike state-of-the-art direct or nonlinear optimization-based multilateration methods that are prone to non-Gaussian errors in the inputs.

Therefore, the Hough transform-based solution to this problem comprises the following steps of an embodiment:

1. A 3-dimensional accumulator matrix is initialized to all zeros.
2. For each ToA detection $t_{i,j}$ by sensor $M_i$ located at $(x_i,y_i)$, the above conical surface is computed, and the accumulator bins that the cone surface intersects are incremented.
3. A peak detector is invoked on the accumulator matrix to extract the parameters of the local maxima (above some reasonable threshold of 3 or more). The $(x_j,y_j)$ coordinates of the maxima are the source positions, and $t_j$ values are the times of the events.

Note that no time of flight information between source of event and sensor is required. The 3-dimensional accumulator matrix "accumulates" data computed with respect to each $M_i$ sensor. For example, with respect to $M_i$ a conical surface is computed extending from the sensor location $(x_i, y_i)$ and beginning with $t_i$ time of arrival. At each point in time extending from t, a corresponding part of the cone surface is computed. Therefore at each incremented point in time this data is recorded or logged in the accumulator matrix. This method repeats with respect to each sensor location $M_i$. Therefore for an event j, the accumulator matrix identifies or reveals the time and location of an event in the form of local maxima. The $(x_j,y_j)$ coordinates of the maxima are the source positions, and $t_j$ values are the times of the events. In this manner, the accumulator matrix may detect the time and location of multiple events.

4. The Hough transform also solved a data association problem of identifying which ToA detection is generated by which acoustic event, as well as filtering out ToA detections for which no acoustic event was identified. That is, the set of ToA detections that contributed to the accumulator bin at a local maximum are guaranteed to belong to the same acoustic event.

Consider the following example. Ten sensors are deployed in the area of interest. Two acoustic events happen simultaneously. Sensors #1 through #4 pick up the first acoustic event, sensors #5 through #8 pick up the second acoustic event, and sensors #9-#10 report random ToA measurements due to some background noise. Using the above described Hough Transform based method, the accumulator matrix will have a local maximum value of 4 at the bin that corresponds to the position and time of the first acoustic event. The ToA measurements that contributed to increasing the value of this bin are the ones taken by sensors #1-#4. That is, if we modify the procedure that constructs the accumulator matrix such that for each bin, it also remembers the ToA measurements whose cones intersect the bin, we will be able to tell for each bin (in particular for the bins at the local maxima) the set of ToA measurements that agree with the acoustic event having happened inside that bin. In the context of the above example, one of the local maxima of the accumulator matrix will have ToA measurements #1-#4 associated with it, the second local maximum will have the ToA measurements #5-#8 associated with it, while ToA measurements #9 and #10 will not be associated with any maxima (they are, in effect, filtered out).

Notice that the accuracy of a Hough transform-based result depends on the resolution of the accumulator matrix. For instance, if we use a bin size of 5×5 meters, the Hough Transform will compute the bin from which the acoustic event emanated, however, it does not tell exactly where in that bin the exact location of the acoustic source is. Reporting the center of the bin as the source location may result in a quantization error as large as half of the diagonal of the bin. One way of improving the localization accuracy is decreasing the bin size, i.e. increasing the resolution of the accumulator matrix. Unfortunately, this would also increase the computational costs of the algorithm, which we often cannot afford. Instead, we run the Hough Transform with a low resolution to compute coarse-grained estimates of the acoustic source positions and to find which ToA measurements are associated with which position estimates. Then, for each such set of ToA measurements, we use a nonlinear optimization method, seeded with the coarse-grained source position estimate, to converge to a fine-grained solution.

We solve the 2-dimensional multilateration problem for each set of ToA measurements $t_i$ by solving the following nonlinear system of equations:

$$\sqrt{(x_1 - x_e)^2 + (y_1 - y_e)^2} - \sqrt{(x_2 - x_e)^2 + (y_2 - y_e)^2} = c(t_1 - t_2)$$
$$\sqrt{(x_2 - x_e)^2 + (y_2 - y_e)^2} - \sqrt{(x_3 - x_e)^2 + (y_3 - y_e)^2} = c(t_2 - t_3)$$
$$...$$
$$\sqrt{(x_{n-1} - x_e)^2 + (y_{n-1} - y_e)^2} - \sqrt{(x_n - x_e)^2 + (y_n - y_e)^2} = c(t_{n-1} - t_n)$$
$$...$$

where $(x_i,y_i)$ are the known sensor locations, $(x_e,y_e)$ is the position of the acoustic source, and c is the speed of sound. Each equation states that the distance difference of two sensors from the acoustic source equals the speed of sound times the time difference of arrival of the acoustic signal between the two sensors. Given n ToA measurements, we can construct n-1 such independent equations. At least two equations (three ToA measurements) are required to solve for the 2-dimensional source position. If three or more ToA measurements are available, we also solve for c, the speed of sound. To speed up the convergence of the nonlinear solver, we set the initial value of $(x_e,y_e)$ to the coarse-grained solution computed by the Hough Transform.

Figure 5:
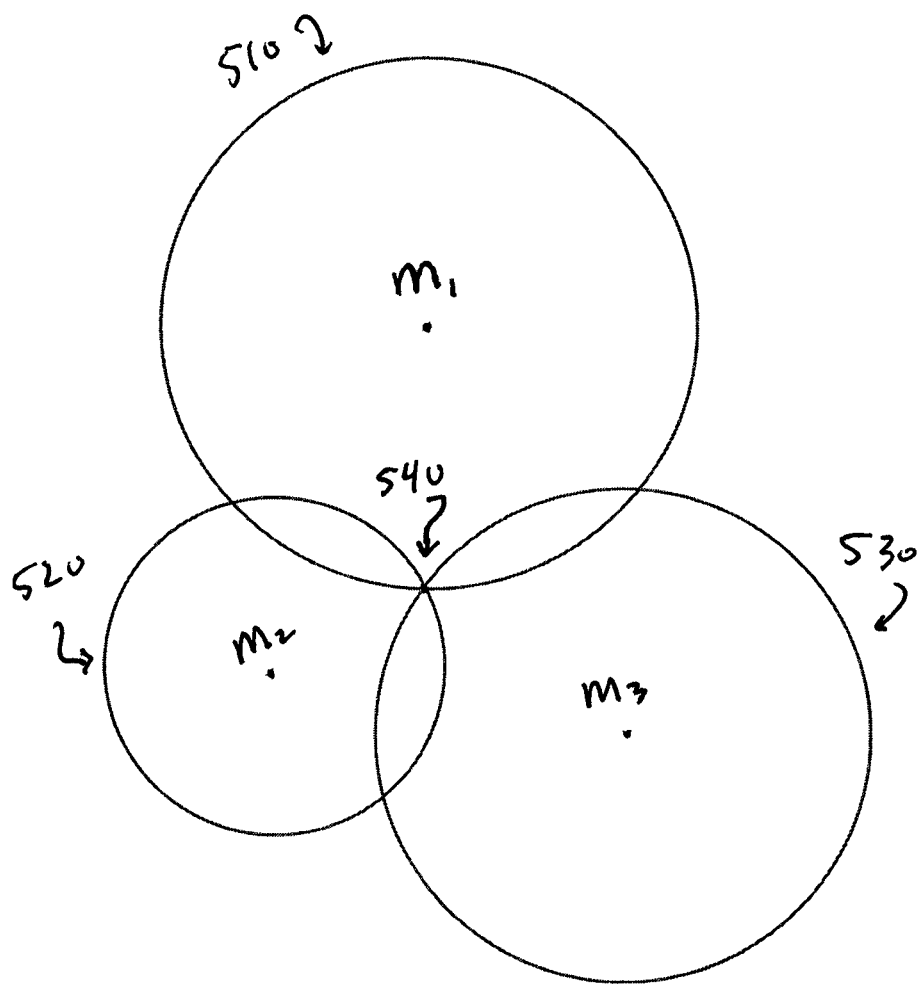
FIG. 5 shows a top down view of three conical shapes constructed with respect to sensors according to the Hough transform-based solution, under an embodiment.

FIG. 5 shows a top down view of three conical shapes 510, 520, 530 constructed with respect to sensors M1, M2, and M3 according to the Hough transform-based solution set forth above. Note the axes of the cones extend upward perpendicular to the page (not shown). FIG. 5 shows that the conical shapes intersect at point 540 which corresponds to the (x, y) location of the source event.

Figure 6:
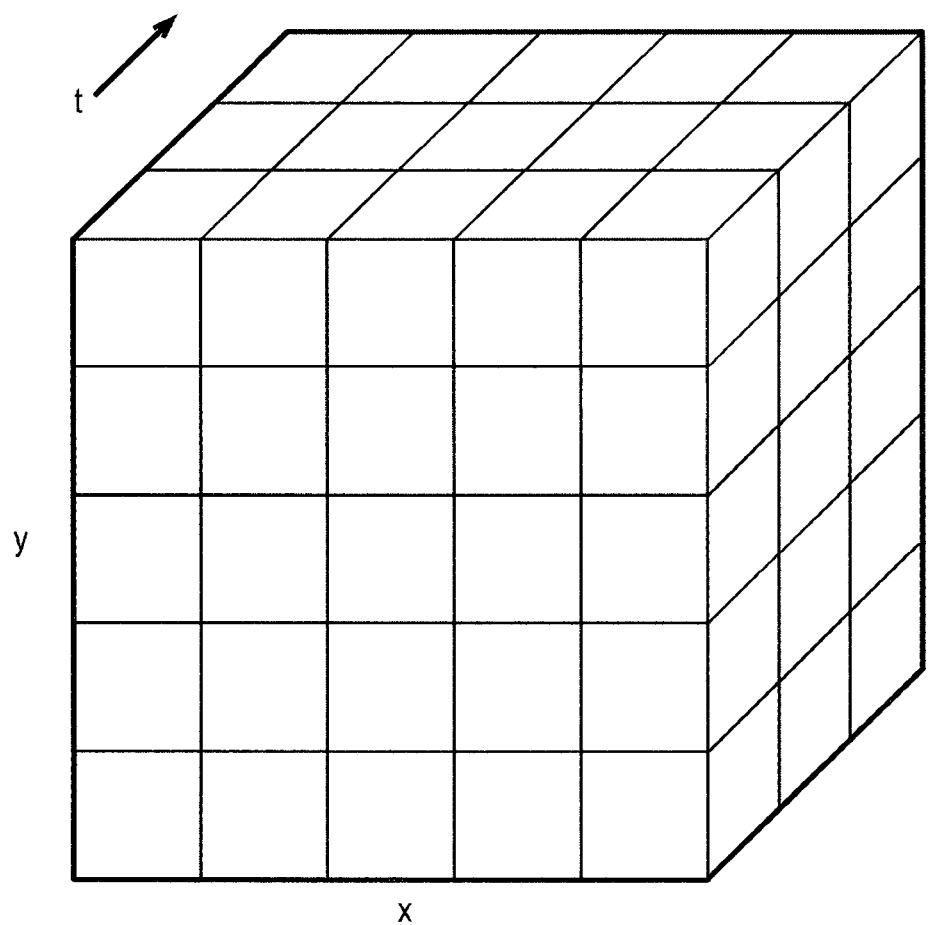
FIG. 6 shows a simplified visual representation of a 3-dimensional accumulator matrix (x, y, t), under an embodiment.

FIG. 6 shows a simplified visual representation of a 3-dimensional accumulator matrix (x, y, t), under an embodiment.

Due to ToA measurement errors, as well as the quantized nature of the accumulator matrix, it is possible that a single acoustic event will result in more than one local maxima in the accumulator matrix. We have observed that the corresponding solutions will either be close to one another in both space and time, or their distance in space will be approximately their distance in time multiplied by the speed of sound. Furthermore, it is also possible that the set of ToA detections associated with different local maxima will differ. We avoid reporting such local maxima as different events by merging their ToA detection sets and computing the final results by numerically solving the multilateration problem with the merged set as input.

Under an alternative embodiment, the above technique can easily be augmented by angle of arrival information. When computing the cone surface, only those accumulator bins that are (approximately) at a given bearing from the cone's axis are incremented. That is, if the sensor position is $(x_i,y_i)$, the angle of arrival is y, and we computed that the point $(x_k,y_k,t_k)$ is on the cone's surface, we only increment the accumulator bin corresponding to this point if it is in the direction of the AoA. Formally:

$$\gamma - \varepsilon < \tan^{-1}\frac{y_k - y_i}{x_k - x_i} < \gamma + \varepsilon$$

where ε is a suitable constant to accommodate the handling of AOA measurement errors.

Figure 7:
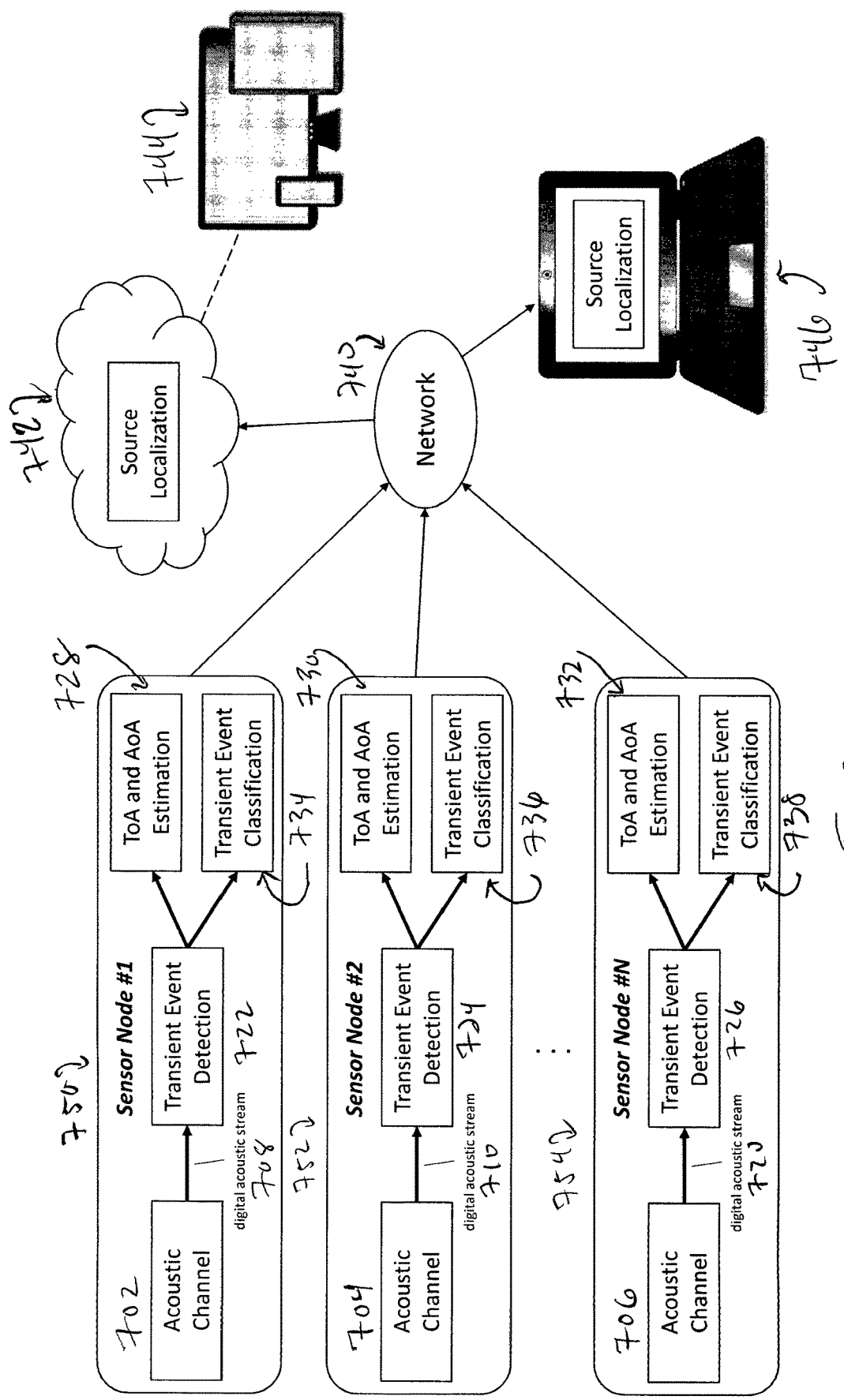
FIG. 7 shows steps of a transient acoustic event detection, classification, and localization approach, under an embodiment.

FIG. 7 shows steps of a transient acoustic event detection, classification, and localization approach, under an embodiment. FIG. 7 shows sensor nodes 1-N. Under one embodiment a transient acoustic event detection, classification, and localization system may comprise three sensors 750, 752, 754. The sensors include acoustic channels 702, 704, 706. The acoustic channels detect and process analog acoustic signals to provide digital acoustic streams 722, 724, 726 for transient event detection computations 722, 724, 726. Each sensor node then estimates ToA and AoA 728, 730, 732 for the received acoustic signal. Each sensor node also applies CNN analysis 734, 736, 738 to classify the transient event. The sensor nodes provide computed information to either a dedicated server 746 or a cloud computing infrastructure 742 for source localization computation. Results of the source localization computation may be presented through display 744.

Figure 8:
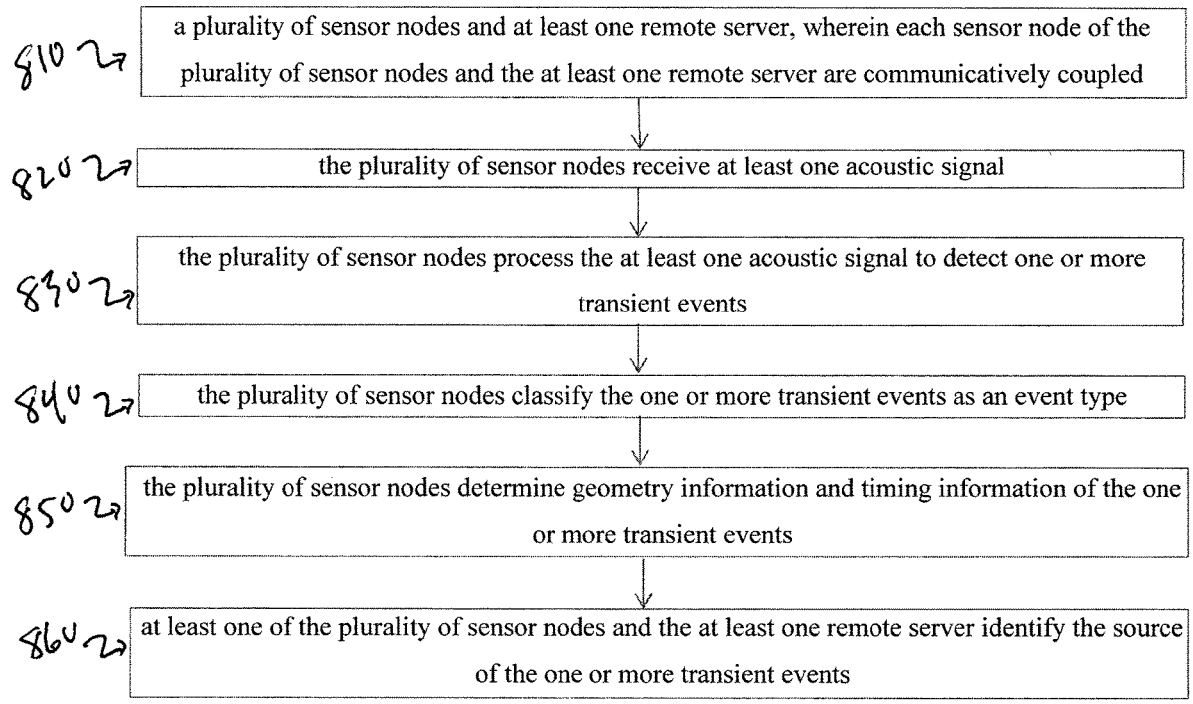
FIG. 8 show shows steps of a transient acoustic event detection, classification, and localization approach, under an embodiment.

FIG. 8 shows steps of a transient acoustic event detection, classification, and localization approach. Step 810 includes a plurality of sensor nodes and at least one remote server, wherein each sensor node of the plurality of sensor nodes and the at least one remote server are communicatively coupled. Step 820 includes the plurality of sensor nodes receiving at least one acoustic signal. Step 830 includes the plurality of sensor nodes processing the at least one acoustic signal to detect one or more transient events. Step 840 includes the plurality of sensor nodes classifying the one or more transient events as an event type. Step 850 includes the plurality of sensor nodes determining geometry information and timing information of the one or more transient events. Step 860 includes at least one of the plurality of sensor nodes and the at least one remote server identifying the source of the one or more transient events.

Figure 9A:
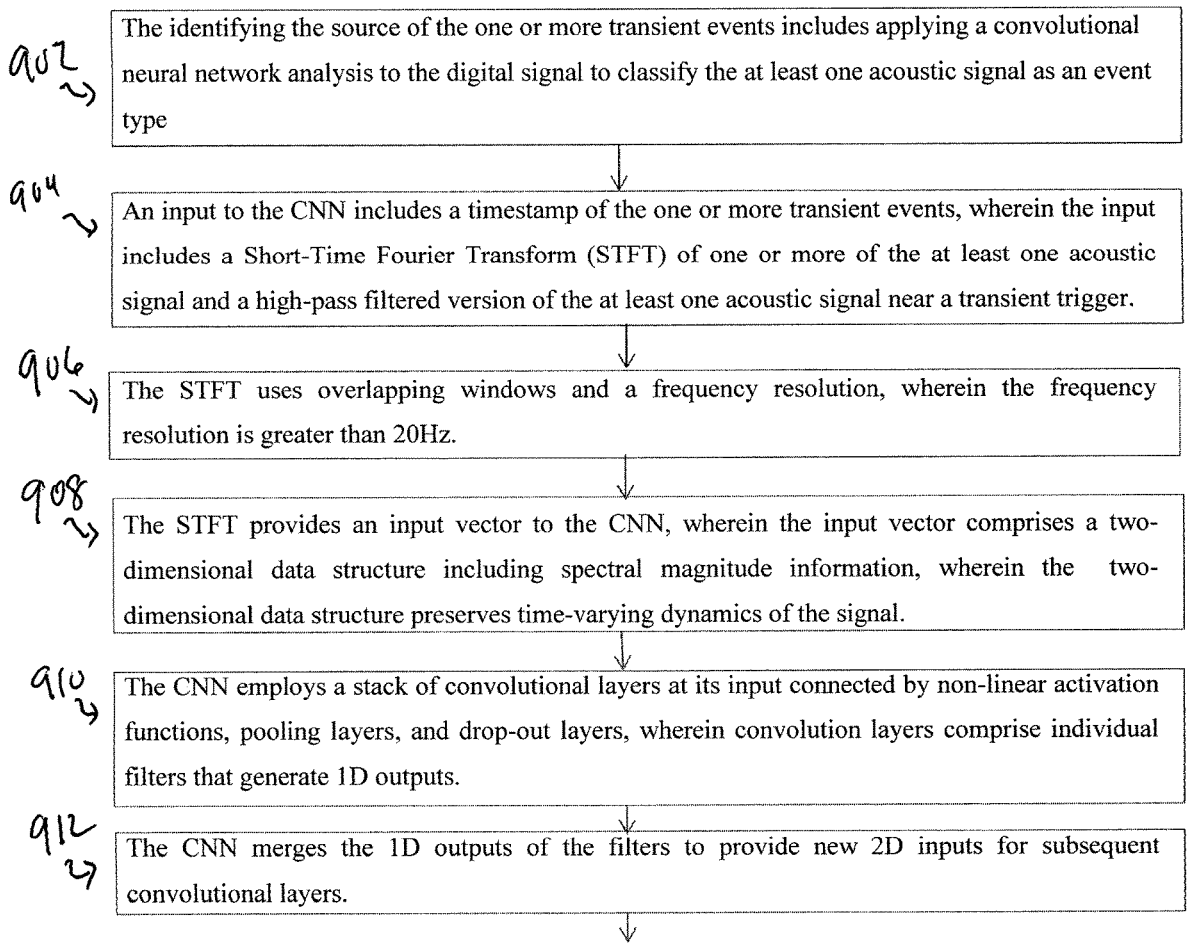
FIG. 9A shows the steps of convolutional neural network (CNN) analysis, under an embodiment.
Figure 9B:
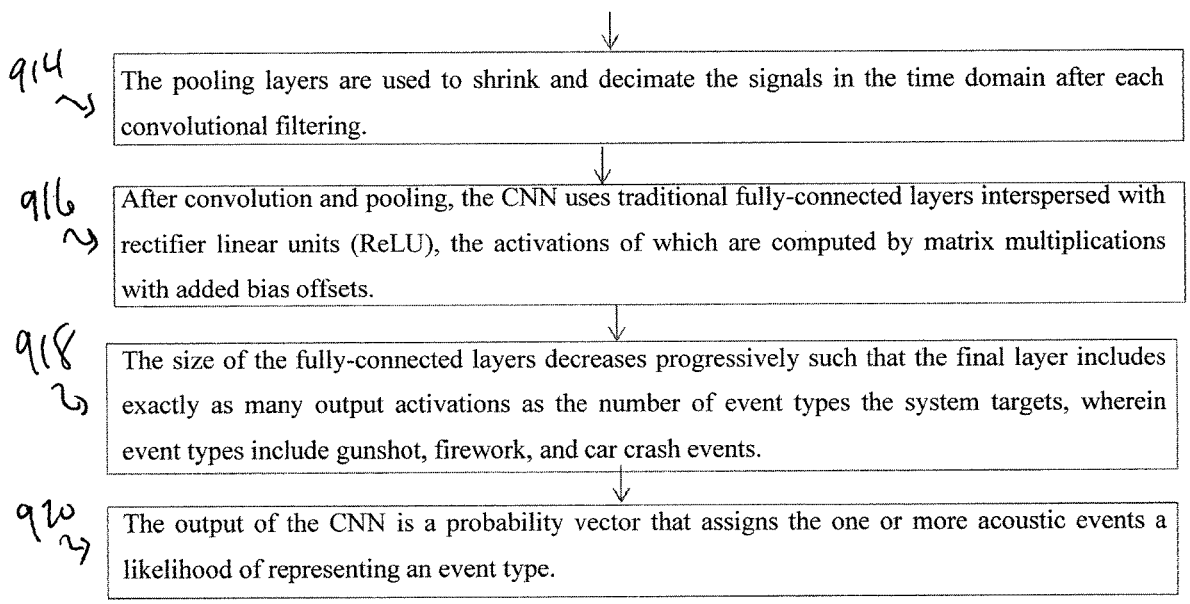
FIG. 9B shows the steps of convolutional neural network (CNN) analysis, under an embodiment.

FIG. 9A and FIG. 9B show the steps of convolutional neural network (CNN) analysis corresponding to step 840 of FIG. 8. At step 902 the identifying the source of the one or more transient events includes applying a convolutional neural network analysis to the digital signal to classify the at least one acoustic signal as an event type. At step 904 an input to the CNN includes a timestamp of the one or more transient events, wherein the input includes a Short-Time Fourier Transform (STFT) of one or more of the at least one acoustic signal and a high-pass filtered version of the at least one acoustic signal near a transient trigger. At step 906 the STFT uses overlapping windows and a frequency resolution, wherein the frequency resolution is greater than 20 Hz. At step 908 the STFT provides an input vector to the CNN, wherein the input vector comprises a two-dimensional data structure including spectral magnitude information, wherein the two-dimensional data structure preserves time-varying dynamics of the signal. At step 910 the CNN employs a stack of convolutional layers at its input connected by non-linear activation functions, pooling layers, and drop-out layers, wherein convolution layers comprise individual filters that generate 1D outputs. At step 912 the CNN merges the 1D outputs of the filters to provide new 2D inputs for subsequent convolutional layers. At step 914 the pooling layers are used to shrink and decimate the signals in the time domain after each convolutional filtering. At step 916 after convolution and pooling, the CNN uses traditional fully-connected layers interspersed with rectifier linear units (ReLU), the activations of which are computed by matrix multiplications with added bias offsets. At step 918 the size of the fully-connected layers decreases progressively such that the final layer includes exactly as many output activations as the number of event types the system targets, wherein event types include gunshot, firework, and car crash events. At step 920 the output of the CNN is a probability vector that assigns the one or more acoustic events a likelihood of representing an event type.

A method of transient acoustic event detection, classification, and localization is described under one embodiment that comprises a distributed network containing one or more acoustic sensors, wherein the sensing devices are configured to communicate with one or more of a cloud-based server, a dedicated server, or any number of other sensing devices in the vicinity. The method includes configuration of the plurality of acoustic sensors in the distributed network to continuously monitor streams of multi-channel audio, searching for impulsive acoustic events of interest. The method includes classification of detected events of interest into pre-defined event types or groupings. The method includes determination of event geometry and timing information including, but not limited to, the Angle of Arrival (AoA) and Time of Arrival (ToA) of the audio event of interest. The method includes sharing of these events and event data with a cloud-based or dedicated server or a plurality of acoustic sensors in the vicinity. The method includes processing of these aggregated events and event data sets from one or more acoustic sensors in a given vicinity at approximately the same time to uniquely localize the source of an acoustic event of interest.

Each acoustic sensing device is under an embodiment equipped with at least four acoustic channels containing one microphone each, a GPS or other position- and timing-producing chip, a means of communication with one or more remote devices, and a computer processor or microprocessor with sufficient computational capabilities to carry out the required acoustic signal processing, detection, and classification methodologies.

The communication between devices or servers can occur either directly or indirectly via wired or wireless media under an embodiment.

All acoustic channels are continuously converted from analog to digital format at a pre-specified sampling rate and resolution under an embodiment.

One or more event detection algorithms are run continuously and simultaneous on one or more digitally converted audio streams under an embodiment.

Event classification is under an embodiment performed upon successful event detection.

Event classification can be performed on any one audio channel or on a composite signal obtained by spatial-filtering all audio channels steered toward the event of interest under an embodiment.

Spatial filtering can take the form of beamforming under an embodiment.

The Angle of Arrival (AoA) of the event of interest in the acoustic signal is under an embodiment estimated by cross-correlating pairs of channels on a single acoustic sensing device, in one embodiment.

The Time of Arrival (ToA) of the event of interest in the audio signal is under an embodiment estimated on a precise absolute time scale by timestamping the maximum of the cross-correlation function within the event using the Pulse Per Second (PPS) pin of the GPS chip on the sensor node.

The aggregate detected event classes, AoAs, and ToAs of the event from two or more acoustic sensors in the vicinity are used to localize the point of origin of the detected event. This data from only one sensor can be used to provide the direction of the detected event.

Transient events are detected by threshold crossings of the spectral-flux signal which measures the magnitude change across frequency bins using a short-time Fourier transform under an embodiment.

The short-time Fourier transform of the audio signal is computed using a fixed frequency resolution and time overlap under an embodiment.

The change in spectral magnitudes in adjacent timeslots of selected frequency bins is measured using the $L_2$-norm under an embodiment.

The resulting $L_2$ distance value constitutes the spectral flux measurement.

A potential transient event of interest is detected whenever the spectral flux measurement rises above an adaptive threshold level under an embodiment.

The adaptive threshold is under an embodiment computed by applying an exponential filter with an absolute minimum value and a rising edge override to the spectral flux signal, allowing the threshold to rise almost as fast as the original spectral flux signal and ensuring that it does not dip below a pre-defined value.

Event classification is carried out using a deep convolutional neural network (CNN) with the following characteristics:

Inputs to the CNN include under an embodiment the timestamp of the transient event of interest along with a Short-Time Fourier Transform (STFT) of either the original audio signal or its high-pass filtered version near the transient trigger.

The audio signal inputs to the STFT may under an embodiment include one or more of raw audio data captured at each microphone or different filtered combinations of selected audio channels.

The STFT procedure may use overlapping windows and a few tens of Hertz frequency resolution in one embodiment.

The output of the CNN is a probability vector for each potential event of interest in the input sample representing the likelihood that each event is actually an instance of one of a predefined set of classifications, such as a gunshot, firework, car crash, etc.

The STFT input vector to the CNN is under an embodiment a two-dimensional data structure containing spectral magnitude information while preserving the time-varying dynamics of the signal.

The CNN employs under an embodiment a stack of convolutional network layers at its input connected by non-linear activation functions, pooling, and drop-out layers.

Subsequent convolutional layers are under an embodiment fed new 2D inputs created by merging the 1D outputs of the individual filters in the layer immediately before it.

Pooling layers are under an embodiment used to shrink and decimate the signals in the time domain after convolutional filtering.

After convolution and pooling, the CNN uses under an embodiment traditional fully-connected layers interspersed with rectifier linear units (ReLU), the activations of which are computed by matrix multiplications with added bias offsets.

The size of the fully-connected layers decreases under an embodiment progressively such that the final layer contains exactly as many output activations as the number of classification categories the system is targeting (e.g., gunshot, firework, etc).

The weights and biases used in the CNN classification network are calculated through a supervised learning process with a large set of labeled example data, the result of which is embedded in each acoustic sensing device.

The source localization function comprises under an embodiment a Hough transform-based algorithm with the following characteristics.

The source position of an event of interest is under an embodiment designated by $(x_e, y_e, t_e)$ where $(x_e, y_e)$ are the two-dimensional coordinates of the event source and $t_e$ is the time of emission of the acoustic event.

The position of each acoustic sensing device taking part in the localization is under an embodiment designated for each sensor i as $(x_i, y_i)$, the time of arrival of the wavefront emitted by the acoustic event of interest at sensor i is designated as $t_i$, and the cone angle of a surface produced by extending a cone from the 3D sensor location at $(x_i, y_i, t_i)$, where time is the third dimension perpendicular to the (x,y) plane, is calculated as $\tan^{-1} c$, with c being the speed of sound.

A Hough accumulator matrix is constructed under an embodiment according to some predefined resolution, the computed cones for all sensing devices taking part in the localization are traversed, and the position parameters of each cone are used to increment the relevant accumulator matrix bins.

A peak detector is under an embodiment invoked on the accumulator matrix to extract the parameters of the local maxima, j, above some reasonable threshold (>2) corresponding to the intersection points of the various cones, where the $(x_j, y_j)$ coordinates of the maxima are potential source positions, and $t_j$ values are potential emission times of the events.

The resulting potential source positions are then under an embodiment merged based on their locality in order to overcome quantization errors in the accumulator matrix resulting in different local maxima corresponding to the same acoustic event.

All remaining potential source locations and times, $(x_j, y_j, t_j)$, are under an embodiment further refined by applying a nonlinear optimization procedure to solve the multilateration problem for the merged set of positions and ToAs, resulting in a fine-grained set of source positions and emission times for all events of interest, $(x_e, y_e, t_e)$.

A system is described herein that comprises a plurality of sensor nodes and at least one remote server, wherein each sensor node of the plurality of sensor nodes and the at least one remote server are communicatively coupled, wherein the plurality of sensor nodes receive at least one acoustic signal, process the at least one acoustic signal to detect one or more transient events, classify the one or more transient events as an event type, and determine geometry information and timing information of the one or more transient events. The system includes at least one of the plurality of sensor nodes and the at least one remote server identifying the source of the one or more transient events.

The communicative coupling comprises under an embodiment at least one of a wired and wireless network.

The plurality of sensor nodes exchange under an embodiment at least one of geometry information, timing information, information of the one or more transient events, and information of the event type.

The plurality of sensor nodes provide under an embodiment the at least one remote server at least one of geometry information, timing information, information of the one or more transient events, and information of the event type.

Each sensor node of the plurality of sensor nodes comprises under an embodiment a GPS unit and at least four acoustic channels for receiving the at least one acoustic signal.

Each sensor node of the plurality of sensor nodes continuously samples under an embodiment the at least four acoustic channels and converts the at least one acoustic signal into a digital signal, wherein the digital signal comprises a 4-channel digital signal.

The detecting the one or more transient events includes under an embodiment applying a detection algorithm to the digital signal.

The applying the detection algorithm includes under an embodiment applying a Short Time Fourier Transform to the digital signal using a fixed frequency resolution and a time overlap.

The applying the detection algorithm includes under an embodiment computing a change in spectral magnitudes in adjacent timeslots of selected frequency bins using the L2-norm, wherein the resulting L2 distance values comprise spectral flux measurements.

The applying the detection algorithm includes under an embodiment identifying a potential transient event of interest when the spectral flux measurements rise above an adaptive threshold level.

The system of an embodiment computes under an embodiment the adaptive threshold level by applying an exponential filter with an absolute minimum value and a rising edge override to the spectral flux measurements.

The identifying the source of the one or more transient events includes under an embodiment applying a convolutional neural network analysis to the digital signal to classify the at least one acoustic signal as an event type.

An input to the CNN includes under an embodiment a timestamp of the one or more transient events, wherein the input includes a Short-Time Fourier Transform (STFT) of one or more of the at least one acoustic signal and a high-pass filtered version of the at least one acoustic signal near a transient trigger.

The STFT uses under an embodiment overlapping windows and a frequency resolution, wherein the frequency resolution is greater than 20 Hz.

The STFT provides under an embodiment an input vector to the CNN, wherein the input vector comprises a two-dimensional data structure including spectral magnitude information, wherein the two-dimensional data structure preserves time-varying dynamics of the signal.

The CNN employs under an embodiment a stack of convolutional layers at its input connected by non-linear activation functions, pooling layers, and drop-out layers, wherein convolution layers comprise individual filters that generate 1D outputs.

The CNN merges under an embodiment the 1D outputs of the filters to provide new 2D inputs for subsequent convolutional layers.

The pooling layers are used under an embodiment to shrink and decimate the signals in the time domain after each convolutional filtering.

After convolution and pooling, the CNN uses under an embodiment traditional fully-connected layers interspersed with rectifier linear units (ReLU), the activations of which are computed by matrix multiplications with added bias offsets.

The size of the fully-connected layers decreases under an embodiment progressively such that the final layer includes exactly as many output activations as the number of event types the system targets, wherein event types include gunshot, firework, and car crash events.

The weights and biases used in the CNN classification network are calculated under an embodiment through a supervised learning process with a large set of labeled example data, wherein the identifying the source of the one or more transient events includes accessing the weights and biases stored locally in the plurality of sensor nodes.

The output of the CNN is a probability vector that assigns under an embodiment the one or more acoustic events a likelihood of representing an event type.

The geometry information comprises under an embodiment Angle of Arrival (AoA) of the one or more transient events.

The determining the geometry information comprises under an embodiment estimating the AoA by cross-correlating pairs of channels of the plurality of acoustic channels on a sensor node of the plurality of sensor nodes.

The timing information includes under an embodiment Time of Arrival (ToA) of the one or more transient events.

The determining the timing information comprises under an embodiment estimating the ToA on a precise absolute time scale by timestamping the maximum of a cross-correlation function within the at least one acoustic signal using a Pulse Per Second (PPS) pin of the GPS unit in a sensor node of the plurality of sensor nodes.

The identifying the source of the one or more transient events includes designating under an embodiment a location for each sensor device of the plurality of sensor devices as $(x_i, y_i)$. The identifying the source of the one or more transient events includes designating under an embodiment a ToA of the at least one acoustic signal with respect to each sensor device of the plurality of sensor devices as $t_i$.

The identifying the source of the one or more transient events includes describing under an embodiment a conical surface for each sensor node of the plurality of sensor nodes, the describing including extending a cone from location $(x_i, y_i, t_i)$, wherein $t_i$ comprises a third dimension perpendicular to the $(x_i, y_i)$ plane.

A cone angle of the conical surface for each sensor node of the plurality of sensor nodes is calculated as $\tan^{-1} c$, wherein c comprises the speed of sound.

The identifying the source of the one or more transient events includes under an embodiment providing a Hough accumulator matrix, wherein the Hough accumulator matrix provides two dimensional locations (x, y) spanning a geographic area.

The Hough accumulator matrix provides under an embodiment a third dimension t, wherein the Hough accumulator matrix comprises matrix bins (x, y, t).

The identifying the source of the one or more transient events includes under an embodiment incrementing a bin of the accumulator matrix when a conical surface of any sensor node of the plurality of sensor nodes intersects with a bin.

The identifying the source of the one or more transient events includes under an embodiment incrementing a bin only when the bin in is in a direction of an AoA with respect to any sensor node of the plurality of sensor nodes.

The identifying the source of the one or more transient events includes under an embodiment invoking a peak detector on the accumulator matrix to extract parameters of the local maxima equal to or above a threshold of 3 or more, wherein $(x_j, y_j)$ coordinates of the maxima are potential source positions of the one or more transient events, and $t_j$ values are the times of the one or more transient events, where the subscript j indexes the one or more transient events.

The identifying the source of the one or more transient events includes under an embodiment merging the potential source positions based on their locality in order to overcome quantization errors in the accumulator matrix resulting in different local maxima corresponding to a same event of the one or more transient events.

The identifying the source of the one or more transient events includes under an embodiment applying a nonlinear optimization procedure to solve the multilateration problem for the merged potential source positions and corresponding ToAs, resulting in a fine-grained set of source positions and emission times for the one or more transient events.

Computer networks suitable for use with, the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for transient acoustic event detection, classification, and localization described herein can be a component of a single system, multiple systems, and/or geographically separate systems. The systems and methods for transient acoustic event detection, classification, and localization can also be a subcomponent or subsystem of a single system, multiple systems, and/or geographically separate systems. The systems and methods for transient acoustic event detection, classification, and localization components can be coupled to one or more other components (not shown) of a host system or a system coupled to the host system.

One or more components of the systems and methods for transient acoustic event detection, classification, and localization and/or a corresponding interface, system or application to which the systems and methods for transient acoustic event detection, classification, and localization is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for transient acoustic event detection, classification, and localization can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for transient acoustic event detection, classification, and localization and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for transient acoustic event detection, classification, and localization and corresponding systems and methods include: microcontrollers with memory (such as electronically erasable programmable read only memory (EEPROM)), embedded microprocessors, firmware, software, etc. Furthermore, aspects of the systems and methods for transient acoustic event detection, classification, and localization and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for transient acoustic event detection, classification, and localization and corresponding systems and methods is not intended to be exhaustive or to limit the systems and methods to the precise forms disclosed. While specific embodiments of, and examples for, the systems and methods for transient acoustic event detection, classification, and localization and corresponding systems and methods are described herein for illustrative purposes, various equivalent modifications are possible within the scope of the systems and methods, as those skilled in the relevant art will recognize. The teachings of the systems and methods for transient acoustic event detection, classification, and localization and corresponding systems and methods provided herein can be applied to other systems and methods, not only for the systems and methods described above.

The elements and acts of the various embodiments described above can be combined to provide further embodiments. These and other changes can be made to the systems and methods for transient acoustic event detection, classification, and localization and corresponding systems and methods in light of the above detailed description.

The following references are incorporated herein by reference in their entirety as if directly replicated herein. Further, pinpoint cites are provided to direct a reader to relevant portions of each text.

[1] J. P. Bello, L. Daudet, S. Abdallah, C. Duxbury, M. Davies and M. B. Sandler, "A Tutorial on Onset Detection in Music Signals," in *IEEE Transactions on Speech and Audio Processing*, vol. 13, no. 5, pp. 1035-1047, September 2005.

[2] S. Dixon, "Onset Detection Revisited" *Proceedings of the 9th International Conference on Digital Audio Effects*, Montreal, September 2006, pp 133-137.

[3] D. H. Ballard. 1987. Generalizing the Hough transform to detect arbitrary shapes. In *Readings in computer vision: issues, problems, principles, and paradigms*, Martin A. Fischler and Oscar Firschein (Eds.). Morgan Kaufmann Publishers Inc., San Francisco, Calif., USA 714-725.

[4] Yan Sun; Willett, P., "The Hough transform for long chirp detection," in *Decision and Control*, 2001. *Proceedings of the 40th IEEE Conference on*, vol. 1, no., pp. 958-963 vol. 1, 2001

[5] Mikhalev, A.; Ormondroyd, R. F., "Fusion of Sensor Data for Source Localization using the Hough Transform," in *Information Fusion, 2006 9th International Conference on*, vol., no., pp.1-6, 10-13 July 2006

What is claimed is:

1. A system comprising,
a plurality of sensor nodes and at least one remote server, wherein each sensor node of the plurality of sensor nodes and the at least one remote server are communicatively coupled, wherein the plurality of sensor nodes receive at least one acoustic signal, process the at least one acoustic signal to detect one or more transient events, classify the one or more transient events as an event type, and determine geometry information and timing information of the one or more transient events, wherein the detecting the one or more transient event includes applying a detection algorithm to the digital signal, wherein each sensor nodes of the plurality of sensor nodes comprises a GPS unit and at least four acoustic channels for receiving the at least one acoustic signal, wherein each sensor node of the plurality of sensor nodes continuously samples the at least four acoustic channels and converts the at least one acoustic signal into a digital signal, wherein the digital signal comprises a 4-channel digital signal;
at least one of the plurality of sensor nodes and the at least one remote server identifying the source of the one or more transient events, wherein the identifying the source of the one or more transient events includes applying a convolutional neural network analysis to the digital signal to classify the at least one acoustic signal as an event type, wherein input of the convolutional neural network analysis includes a timestamp of the one or more transient events, wherein the input includes a Short-Term-Fourier Transform (STFT) of one or more of the at least one acoustic signal and a high-pass filtered version of the at least one acoustic signal near a transient trigger.

2. The system of claim 1, wherein the communicative coupling comprises at least one of a wired and wireless network.

3. The system of claim 1, wherein the plurality of sensor nodes exchange at least one of geometry information, timing information, information of the one or more transient events, and information of the event type.

4. The system of claim 1, wherein the plurality of sensor nodes provide the at least one remote server at least one of geometry information, timing information, information of the one or more transient events, and information of the event type.

5. The system of claim 1, the applying the detection algorithm including applying a Short Time Fourier Transform to the digital signal using a fixed frequency resolution and a time overlap.

6. The system of claim 1, the applying the detection algorithm including computing a change in spectral magnitudes in adjacent timeslots of selected frequency bins using the L2-norm, wherein the resulting L2 distance values comprise spectral flux measurements.

7. The system of claim 6, the applying the detection algorithm including identifying a potential transient event of interest when the spectral flux measurements rise above an adaptive threshold level.

8. The system of claim 7, computing the adaptive threshold level by applying an exponential filter with an absolute minimum value and a rising edge override to the spectral flux measurements.

9. The system of claim 1, wherein the STFT uses overlapping windows and a frequency resolution, wherein the frequency resolution is greater than 20 Hz.

10. The system of claim 9, wherein the STFT provides an input vector to the CNN, wherein the input vector comprises a two-dimensional data structure including spectral magnitude information, wherein the two-dimensional data structure preserves time-varying dynamics of the signal.

11. The system of claim 10, wherein the CNN employs a stack of convolutional layers at its input connected by non-linear activation functions, pooling layers, and drop-out layers, wherein convolution layers comprise individual filters that generate 1D outputs.

12. The system of claim 11, wherein the CNN merges the 1D outputs of the filters to provide new 2D inputs for subsequent convolutional layers.

13. The system of claim 12, wherein the pooling layers are used to shrink and decimate the signals in the time domain after each convolutional filtering.

14. The system of claim 13, wherein after convolution and pooling, the CNN uses traditional fully-connected layers interspersed with rectifier linear units (ReLU), the activations of which are computed by matrix multiplications with added bias offsets.

15. The system of claim 14, wherein the size of the fully-connected layers decreases progressively such that the final layer includes exactly as many output activations as the number of event types the system targets, wherein event types include gunshot, firework, and car crash events.

16. The system of claim 15, wherein the weights and biases used in the CNN classification network are calculated through a supervised learning process with a large set of labeled example data, wherein the identifying the source of the one or more transient events includes accessing the weights and biases stored locally in the plurality of sensor nodes.

17. The system of claim 15, wherein the output of the CNN is a probability vector that assigns the one or more acoustic events a likelihood of representing an event type.

18. The system of claim 1, wherein the geometry information comprises Angle of Arrival (AoA) of the one or more transient events.

19. The system of claim 18, the determining the geometry information comprising estimating the AoA by cross-correlating pairs of channels of the plurality of acoustic channels on a sensor node of the plurality of sensor nodes.

20. The system of claim 18, wherein the timing information includes Time of Arrival (ToA) of the one or more transient events.

21. The system of claim 20, the determining the timing information comprising estimating the ToA on a precise absolute time scale by timestamping the maximum of a cross-correlation function within the at least one acoustic signal using a Pulse Per Second (PPS) pin of the GPS unit in a sensor node of the plurality of sensor nodes.

22. The system of claim 20, the identifying the source of the one or more transient events including designating a location for each sensor device of the plurality of sensor devices as $(x_i, y_i)$.

23. The system of claim 22, the identifying the source of the one or more transient events including designating a ToA of the at least one acoustic signal with respect to each sensor device of the plurality of sensor devices as $t_i$.

24. The system of claim 23, the identifying the source of the one or more transient events including describing a conical surface for each sensor node of the plurality of sensor nodes, the describing including extending a cone from location $(x_i, y_i, t_i)$, wherein $t_i$ comprises a third dimension perpendicular to the $(x_i, y_i)$ plane.

25. The system of claim 24, wherein a cone angle of the conical surface for each sensor node of the plurality of sensor nodes is calculated as $\tan^{+1} c$, wherein c comprises the speed of sound.

26. The system of claim 25, the identifying the source of the one or more transient events including providing a Hough accumulator matrix, wherein the Hough accumulator matrix provides two dimensional locations (x, y) spanning a geographic area.

27. The system of claim 26, wherein the Hough accumulator matrix provides a third dimension t, wherein the Hough accumulator matrix comprises matrix bins (x, y, t).

28. The system of claim 27, the identifying the source of the one or more transient events including incrementing a bin of the accumulator matrix when a conical surface of any sensor node of the plurality of sensor nodes intersects with a bin.

29. The system of claim 28, the identifying the source of the one or more transient events including incrementing a bin only when the bin in is in a direction of an AoA with respect to any sensor node of the plurality of sensor nodes.

30. The system of claim 28, the identifying the source of the one or more transient events including invoking a peak detector on the accumulator matrix to extract parameters of the local maxima equal to or above a threshold of 3 or more, wherein $(x_1, y_i)$ coordinates of the maxima are potential source positions of the one or more transient events, and $t_j$ values are the times of the one or more transient events, where the subscript j indexes the one or more transient events.

31. The system of claim 30, the identifying the source of the one or more transient events including merging the potential source positions based on their locality in order to overcome quantization errors in the accumulator matrix resulting in different local maxima corresponding to a same event of the one or more transient events.

32. The system of claim 31, the identifying the source of the one or more transient events including applying a nonlinear optimization procedure to solve the multilateration problem for the merged potential source positions and corresponding ToAs, resulting in a fine-grained set of source positions and emission times for the one or more transient events.

* * * * *